US011493754B2

(12) United States Patent
Wang et al.

(10) Patent No.: US 11,493,754 B2
(45) Date of Patent: Nov. 8, 2022

(54) OPTICAL SCANNING DEVICE AND IMAGING APPARATUS (71) Applicant: Zhuhai Pantum Electronics Co., Ltd., Zhuhai (CN)

(72) Inventors: Chao Wang, Zhuhai (CN); Zhe Shao, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 17/359,231

(22) Filed: Jun. 25, 2021

(65) Prior Publication Data

US 2021/0325666 A1 Oct. 21, 2021

Related U.S. Application Data (63) Continuation of application No. PCT/CN2019/119399, filed on Nov. 19, 2019.

(30) Foreign Application Priority Data

Dec. 29, 2018 (CN) .......................... 201811633814.3

(51) Int. Cl.
*G02B 26/12* (2006.01)
*G03G 15/04* (2006.01)
*G03G 15/043* (2006.01)

(52) U.S. Cl.
CPC ......... *G02B 26/125* (2013.01); *G03G 15/043* (2013.01); *G03G 15/04036* (2013.01)

(58) Field of Classification Search
CPC ........... G03G 15/04036; G03G 15/043; G02B 26/12; G02B 26/125
See application file for complete search history.

(56) References Cited

U.S. PATENT DOCUMENTS

| 2004/0141219 A1* | 7/2004 | Ono | G02B 26/123 |
| | | | 359/204.4 |
| 2004/0169905 A1* | 9/2004 | Hayashi | G02B 26/123 |
| | | | 359/201.1 |

(Continued)

FOREIGN PATENT DOCUMENTS

| CN | 1573586 A | 2/2005 |
| CN | 1641403 A | 7/2005 |

(Continued)

OTHER PUBLICATIONS

The World Intellectual Property Organization (WIPO) International Search Report With Translation and Written Opinion for PCT/CN2019/119399 dated Feb. 7, 2020 6 Pages (including translation).

*Primary Examiner* — Carla J Therrien
(74) *Attorney, Agent, or Firm* — Anova Law Group, PLLC (57) ABSTRACT An optical scanning device and an imaging apparatus are provided. The optical scanning device includes a light source for emitting a light beam, a first optical unit for collimating the light beam emitted by the light source in a main scanning direction and focus the light beam in an auxiliary scanning direction, an optical deflector for deflecting the light beam, and an imaging optical system for guiding the light beam to a scanned surface for imaging. When the optical deflector deflects the light beam at a maximum deflection angle, the light beam in the main scanning direction forms a maximum incident angle $\Phi_{max}$ with a normal line of the scanned surface. A spot tilt rate e/a of a light spot on the scanned surface satisfies $$\frac{e}{a} \leq 10\%,$$

(Continued)

where a is a size of the light spot in the main scanning direction and e is a spot tilt.

10 Claims, 7 Drawing Sheets

(56) References Cited

U.S. PATENT DOCUMENTS

| | | | |
|---|---|---|---|
| 2004/0183890 A1 | 9/2004 | Sakamoto et al. | |
| 2005/0157362 A1* | 7/2005 | Nomura | G02B 26/0816 359/212.1 |
| 2006/0209375 A1* | 9/2006 | Serizawa | G02B 26/121 347/261 |
| 2007/0029471 A1* | 2/2007 | Yamaguchi | G02B 26/125 250/234 |
| 2007/0188839 A1* | 8/2007 | Ishibe | G02B 26/105 359/213.1 |
| 2014/0132695 A1* | 5/2014 | Park | G02B 26/101 359/206.1 |

FOREIGN PATENT DOCUMENTS

| | | |
|---|---|---|
| CN | 1834723 A | 9/2006 |
| CN | 1908727 A | 2/2007 |
| CN | 101021618 A | 8/2007 |
| CN | 109633894 A | 4/2019 |
| JP | 2004085969 A | 3/2004 |
| JP | 2004280056 A | 10/2004 |
| JP | 2016151590 A | 8/2016 |
| JP | 2018101028 A | 6/2018 |

* cited by examiner

OPTICAL SCANNING DEVICE AND IMAGING APPARATUS

CROSS-REFERENCES TO RELATED APPLICATION

This application is a continuation of International Application No. PCT/CN2019/119399, filed on Nov. 19, 2019, which claims the priority of Chinese Patent Application No. 201811633814.3, filed on Dec. 29, 2018, the contents of which are incorporated herein by reference in its entirety.

TECHNICAL FIELD

The present disclosure generally relates to the field of optical scanning technology and, more particularly, relates to an optical scanning device and an imaging apparatus.

BACKGROUND

Optical scanning devices are widely used in imaging fields such as printing imaging, graphic copying, laser coding, and medical imaging. For example, in a printer or copier product that forms an image on a recording medium, an optical scanning device is used to scan and form an electrostatic latent image on a scanned surface of a photosensitive drum, and the electrostatic latent image is transferred to a paper surface for printing or copying after a development process. The optical scanning device has a greater impact on the volume of the overall product, and it is necessary to shorten an optical path of the optical scanning device to reduce the volume of the optical scanning device, thereby reducing the volume of the overall product.

Existing optical scanning devices usually increase maximum incident angles in main scanning directions and shorten optical paths by changing the refractive index and surface curvature of lens systems, to reduce the volume of the optical scanning devices.

However, when the maximum scanning incident angle of the light beam incident on the photosensitive drum is too large, positions of the exposure points at two ends of the photosensitive drum may be tilted, therefore increasing the actual exposure point size and resulting in blurred edges of the transferred image. Therefore, the image quality of the existing optical scanning devices after miniaturization is not good.

SUMMARY

One aspect of the present disclosure provides an optical scanning device. The device includes: a light source, configured to emit a light beam; a first optical unit, configured to collimate the light beam emitted by the light source in a main scanning direction and focus the light beam emitted by the light source in an auxiliary scanning direction; an optical deflector, configured to deflect the light beam emitted by the light source; and an imaging optical system, configured to guide the light beam deflected by the optical deflector to a scanned surface for imaging. When the optical deflector deflects the light beam emitted by the light source at a maximum deflection angle, the light beam emitted from the imaging optical system forms a maximum incident angle $\Phi_{max}$ with a normal line of the scanned surface in the main scanning direction; and a spot tilt rate e/a of a light spot on the scanned surface formed by the imaging optical system satisfies $$\frac{e}{a} \leq 10\%,$$

where a is a size of the light spot in the main scanning direction, e is amount of spot tilt with $$e = \frac{b}{2}\tan(\phi_{max})\tan\beta,$$

b is a size of the light spot in the auxiliary scanning direction perpendicular to the main scanning direction, and β is an angle formed by the light beam emitted from the imaging optical system in the auxiliary scanning direction and the normal line of the scanned surface.

Another aspect of the present disclosure provides an imaging apparatus. The imaging apparatus includes an optical scanning device, a photosensitive device, a developing device, a transfer device, and a fixing device. The device includes: a light source, configured to emit a light beam; a first optical unit, configured to collimate the light beam emitted by the light source in a main scanning direction and focus the light beam emitted by the light source in an auxiliary scanning direction; an optical deflector, configured to deflect the light beam emitted by the light source; and an imaging optical system, configured to guide the light beam deflected by the optical deflector to a scanned surface for imaging. When the optical deflector deflects the light beam emitted by the light source at a maximum deflection angle, the light beam emitted from the imaging optical system forms a maximum incident angle $\Phi_{max}$ with a normal line of the scanned surface in the main scanning direction; and a spot tilt rate e/a of a light spot on the scanned surface formed by the imaging optical system satisfies $$\frac{e}{a} \leq 10\%,$$

where a is a size of the light spot in the main scanning direction, e is amount of spot tilt with $$e = \frac{b}{2}\tan(\phi_{max})\tan\beta,$$

b is a size of the light spot in the auxiliary scanning direction perpendicular to the main scanning direction, and β is an angle formed by the light beam emitted from the imaging optical system in the auxiliary scanning direction and the normal line of the scanned surface. The photosensitive device is provided with the scanned surface and configured to sense the light beam emitted from the optical scanning device to form an electrostatic latent image on the scanned surface. The developing device is configured to make the electrostatic latent image develop to form a toner image. The transfer device is configured to transfer the toner image to a transfer medium. The fixing device is configured to fix the transferred toner image on the transfer medium.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the disclosure. Furthermore, a three-dimensional (3D) size including length, width and depth should be considered during practical fabrication.

In the following various embodiments, the term "main scanning direction" refers to the direction perpendicular to both the rotation axis of the optical deflector and the main optical axis of the imaging optical system, and can also be understood as the direction of the light beam scanning back and forth after the optical deflector deflects the light beam emitted by the light source.

Correspondingly, the term "auxiliary scanning direction" can be understood as a direction parallel to the rotation axis of the optical deflector, and can also be understood as a direction perpendicular to the main scanning direction.

Correspondingly, the term "scanning plane" refers to the plane on which the outgoing light beam of the imaging optical system scans back and forth.

In the following various embodiments, the term "F-θ lens" is also called "f-theta lens". For monochromatic light imaging, an image surface of this type of lens is a flat surface, and the image quality of the entire image surface is consistent with small aberrations. For a certain incident light, a deflection speed corresponds to a certain scanning speed, such that the incident light with equal angular velocity can be used to achieve linear scanning at equal linear velocity.

In the following various embodiments, the term "fθ coefficient" refers to the ratio of ½ of the scanned image height h to the rotation angle θ of the optical deflector, that is, the value of $h/(2\theta)$. The rotation angle θ of the optical deflector is not the beam deflection angle, but should be understood as the rotation angle of the rotation axis of the optical deflector. When the light beam deflected by the optical deflector is completely parallel light, the fθ coefficient is equal to the focal distance of the scanning optical system.

Figure 1:
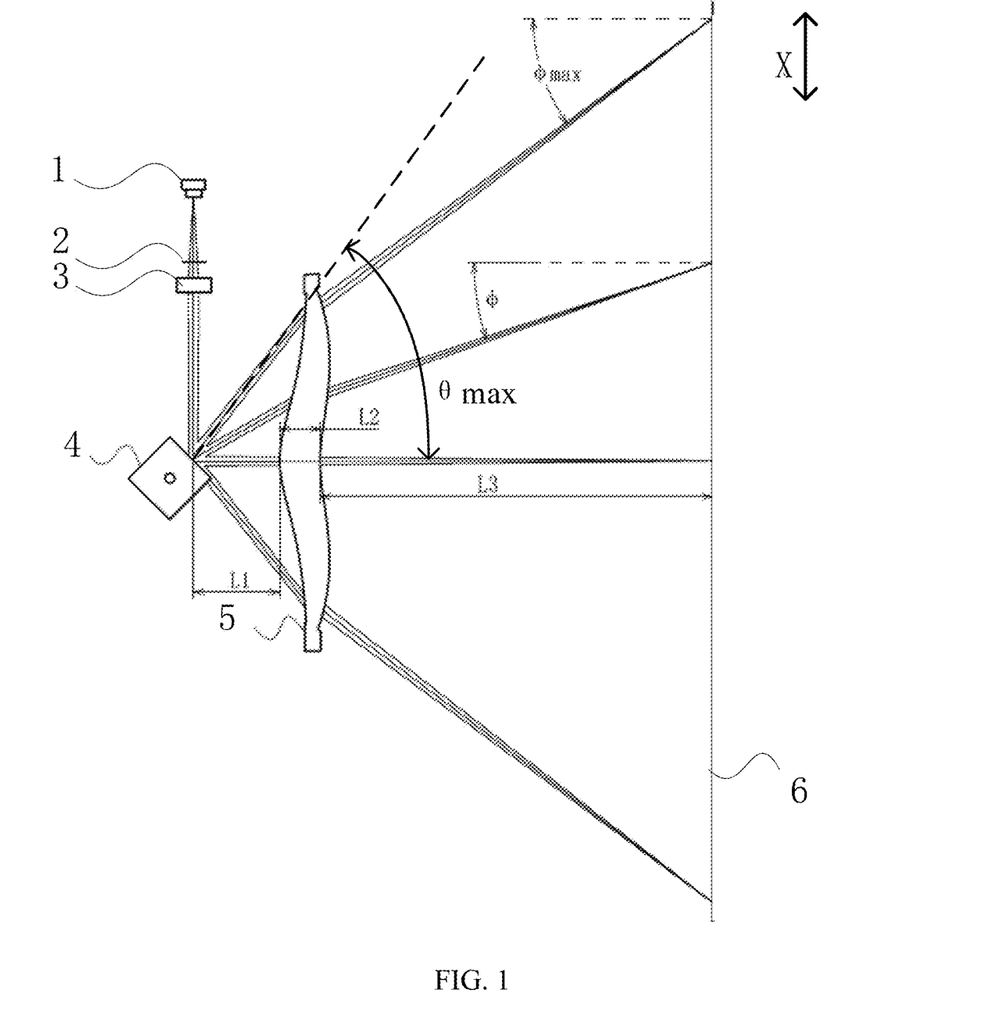
FIG. 1 illustrates an optical structure of the main scanning surface of an exemplary optical scanning device consistent with various disclosed embodiments in the present disclosure.

One embodiment of the present disclosure shown in FIG. 1 provides an optical scanning device. As shown in FIG. 1, the optical scanning device may include a light source 1, a diaphragm 2, a first optical unit 3, an optical deflector 4, and an imaging optical system 5.

The optical deflector 4 may be used to deflect a light beam emitted by the light source 1, such that the light beam may be configured to scan along the main scanning direction. The light beam emitted by the light source 1 may be deflected by the optical deflector 4 toward the scanned surface 6 along the main scanning direction, and as the optical deflector 4 rotates, the light beam may scan back and forth on the scanned surface 6. An optional structure of the optical deflector 4 may be a rotating optical polyhedron with a plurality of reflecting mirror surfaces (for example, a rotating hexahedron with 6 reflecting mirror surfaces), or a transparent disk containing a plurality of lenses. The optical deflector 4 may also be provided with a rotation controller to control the rotation angle and speed of the optical deflector 4. The light beam emitted by the light source 1 may be incident on reflecting surfaces of the optical deflector 4, to be deflected and reflected toward the scanned surface 6. As the optical deflector 4 rotates, the light beam may scan along the main scanning direction X on the scanned surface 6.

The imaging optical system 5 may be used to guide the light beam deflected by the optical deflector 4 to the scanned surface 6 for imaging. The imaging optical system 5 may be disposed between the optical deflector 4 and the scanned surface 6, such that the light beam deflected by the optical deflector 4 could form an image on the scanned surface 6. The imaging optical system 5 may be a plastic optical element or a glass optical element. In one embodiment shown in FIG. 1, the imaging optical system 5 may be a single lens. In other embodiments, the imaging optical system 5 may be a plurality of lenses optically coupled to each other.

Figure 2:
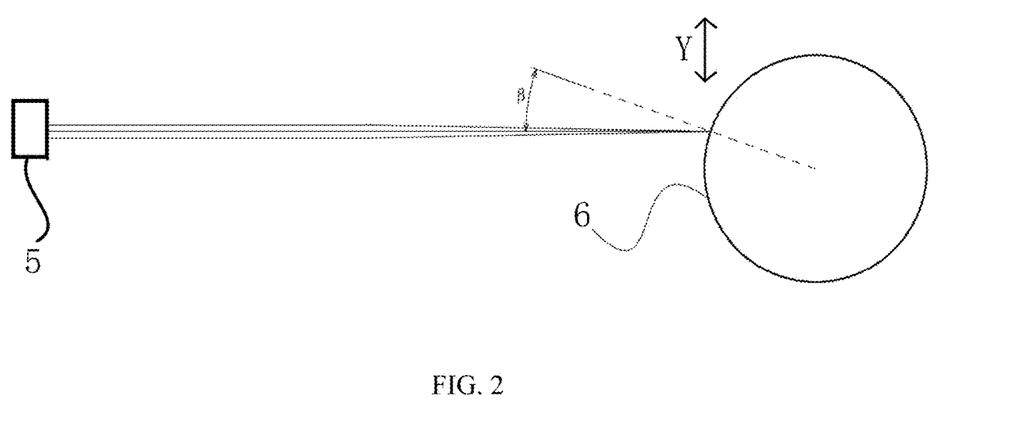
FIG. 2 illustrates an optical structure of an auxiliary scanning surface of an exemplary optical scanning device consistent with various disclosed embodiments in the present disclosure.
Figure 3:
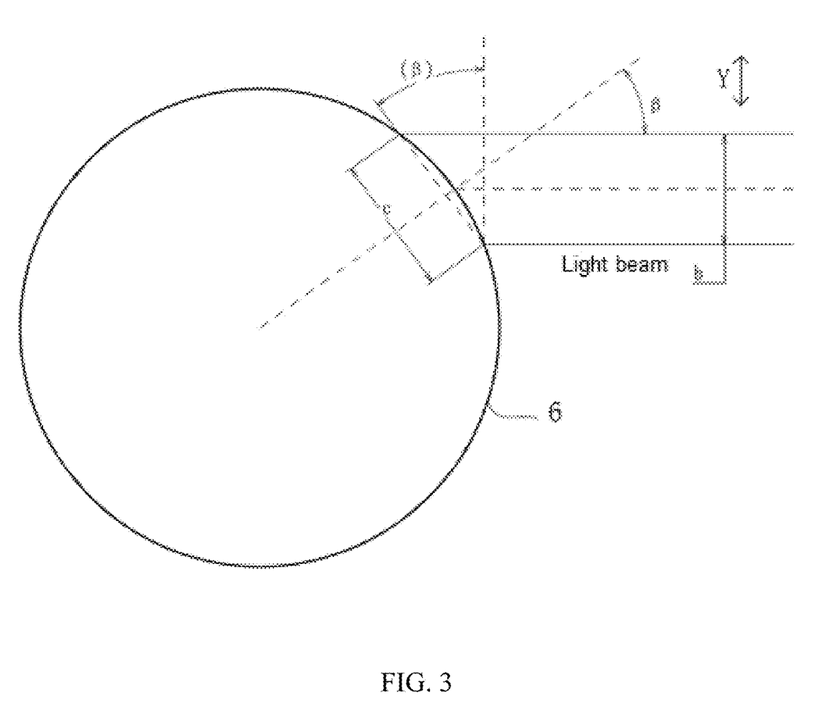
FIG. 3 illustrates a side view of an exemplary optical scanning device with a light beam incident on the scanned surface consistent with various disclosed embodiments in the present disclosure.

FIG. 2 shows an optical structure of an auxiliary scanning surface of the optical scanning device according to one embodiment of the present disclosure. In one embodiment shown in FIG. 2, the scanned surface 6 may be a surface provided by a photosensitive drum and a rotation axis of the photosensitive drum may be lower than a scanning plane of the incident light beam, such that a normal line of the scanned surface 6 and the incident light beam forms an angle β. FIG. 3 shows a schematic side view of the optical scanning device provided by an embodiment of the present disclosure where the light beam enters the scanned surface 6. The incident surface in FIG. 3 may be a surface of the photosensitive drum, for example. When the light beam is incident on the photosensitive drum surface, an angle between the light beam and the normal line at the irradiation point is β, the width of the light beam in the auxiliary scanning direction is b, and a width that the light beam irradiates on the surface of the photosensitive drum is c. It can be seen from FIG. 3 that the angle between the direction of the width dimension c of the light beam irradiating the surface of the photosensitive drum in the auxiliary scanning direction and the vertical direction in FIG. 3 (the direction perpendicular to the rotation axis of the photosensitive drum and the scanning plane of the light beam) is also β.

Figure 4:
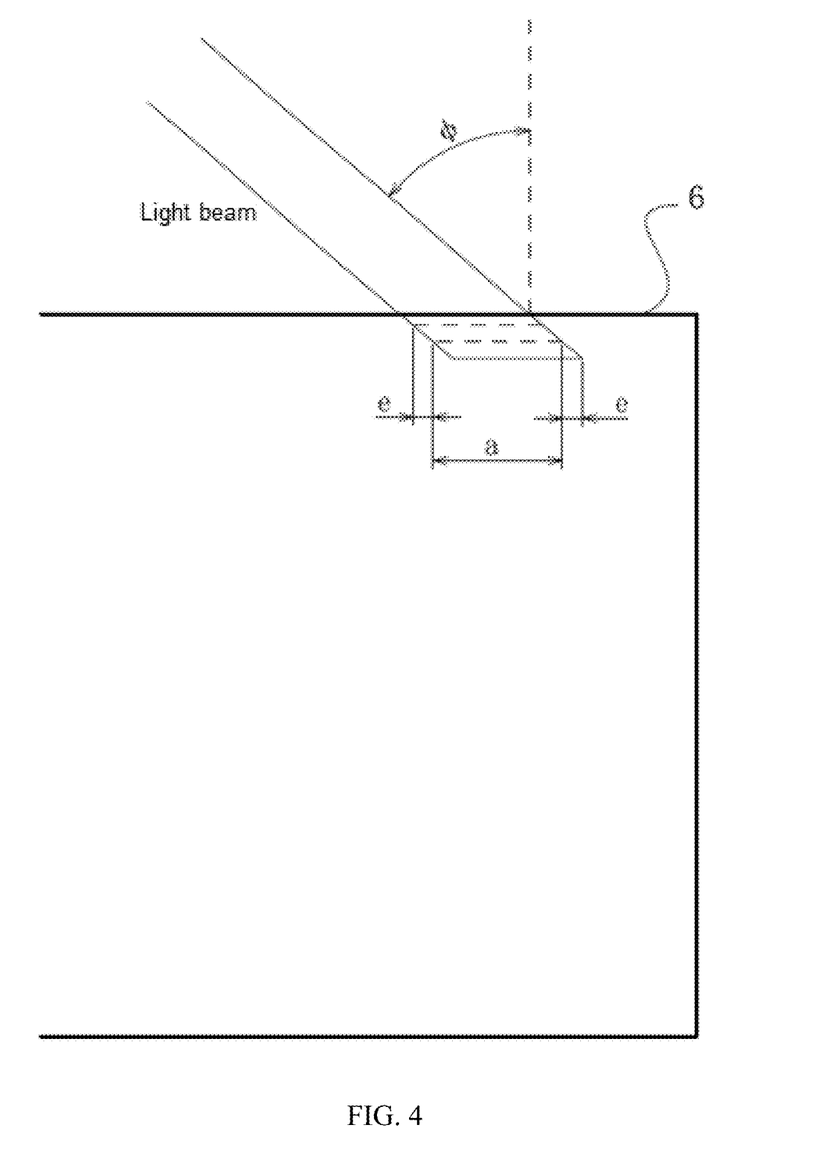
FIG. 4 illustrates a top view of an exemplary optical scanning device with a light beam incident on the scanned surface consistent with various disclosed embodiments in the present disclosure.

FIG. 4 illustrates an exemplary top view of the optical scanning device with the light beam incident on the scanned surface. A diameter of the photosensitive drum is usually above 20 mm, and the size a of the light spot in the main scanning direction and the size b of the auxiliary scanning direction are usually below 100 μm. Therefore, although the light spot on the surface of the photosensitive drum is irradiated on the cylindrical surface of the photosensitive drum, due to the large size difference, the surface of the photosensitive drum can be analyzed approximately according to the plane. When the light beam is incident on the surface of the photosensitive drum, the size of the light spot in the main scanning direction is a, and the angle between the light beam and the main optical axis of the imaging optical system 5 is Φ. A shape of the light spot on the surface of the photosensitive drum may be analyzed by using a parallelogram equivalently since the light beam is incident on the surface of the photosensitive drum.

Figure 5:
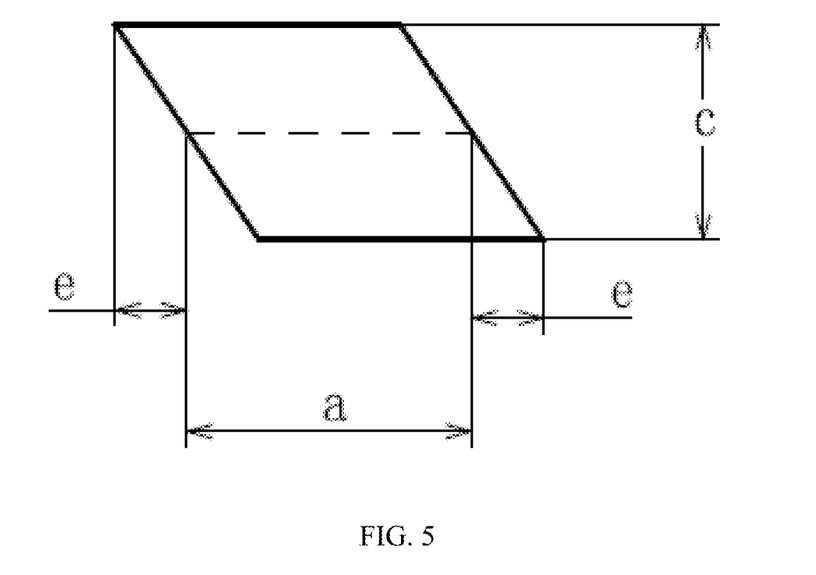
FIG. 5 illustrates a light spot of an exemplary optical scanning device with a light beam incident on the scanned surface consistent with various disclosed embodiments in the present disclosure.
Figure 6:
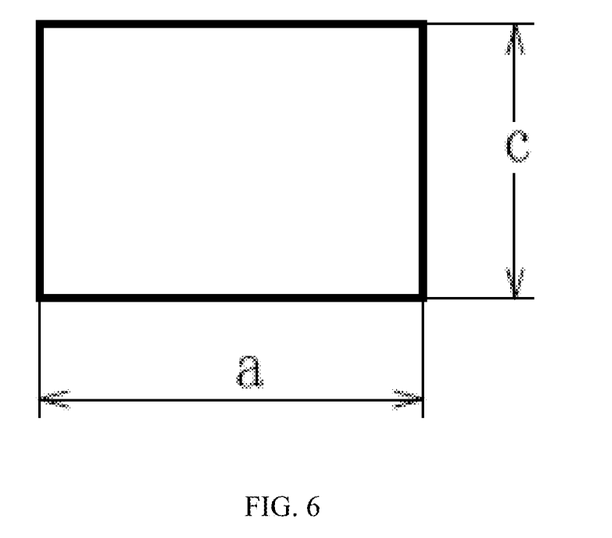
FIG. 6 illustrates another light spot of an exemplary optical scanning device with a light beam incident on the scanned surface consistent with various disclosed embodiments in the present disclosure.

FIG. 5 illustrates an exemplary light spot of the optical scanning device with the light beam incident on the scanned surface, and FIG. 6 illustrates another exemplary light spot of the optical scanning device with the light beam incident on the scanned surface. In one embodiment shown in FIG. 5, the light spot can be understood as the shape of a distal light spot where the light beam is incident on both ends of the photosensitive drum. The light spot shown in FIG. 6 can be understood as a shape of a proximal spot where the light beam is incident on the middle of the photosensitive drum. An equivalent rectangular light spot can be understood as the incident situation where Φ is 0°. For the light spot shown in FIG. 5, since the incident angle of the light beam to the scanned surface 6 is relatively large, the shape of the light spot may be usually inclined. In the main scanning direction, the center size of the light spot may be taken as the light spot reference position, and a size with which the light spot exceeds the light spot reference position in the main scanning direction at two sides may be determined as spot tilt e, as shown in FIG. 4 and FIG. 5.

Figure 7:
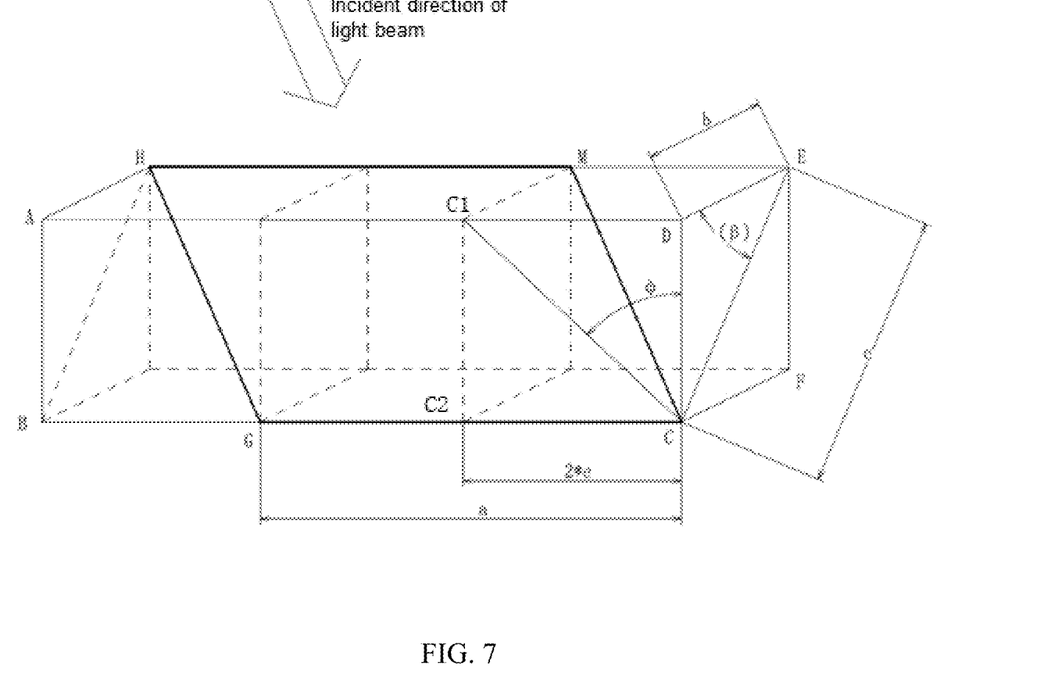
FIG. 7 illustrates a stereo schematic of a light spot of an exemplary optical scanning device with a light beam incident on the scanned surface consistent with various disclosed embodiments in the present disclosure.

FIG. 7 illustrates an exemplary stereo schematic of a light spot of the optical scanning device with the light beam incident on the scanned surface. As shown in FIG. 7, a plane BHEC may be equivalent to a plane on which the surface of the photosensitive drum is located and can be understood as the scanned surface 6. BC may be parallel to the main scanning direction and CE may be perpendicular to BC. A parallelogram GHMC on the plane BHEC may be equivalent to the area where the light beam irradiates on the surface of the photosensitive drum. The plane DEFC may be perpendicular to BC, and a length of DE may be equal to the length b of the light spot in the auxiliary scanning direction. Since DC is perpendicular to BC and C1-C is in the direction of the light beam irradiation, the angle between C1-C and DC may be equivalent to the incident angle Φ formed by the normal line at the intersection between the light beam emitted from the imaging optical system 5 and the scanned surface 6 in the main scanning direction (when the scanning angle reaches the maximum value, Φ is $\Phi_{max}$). According to FIG. 3, in the auxiliary scanning direction, the angle between the light beam incident on the photosensitive drum and the normal line at the intersection of the photosensitive drum is βt, which may be equivalent to that the angle between DE and CE in FIG. 7 is β. Since CE is perpendicular to HM and GC, a length of CE may be the width c of the light spot falling on the surface of the photosensitive drum in the auxiliary scanning direction and C2-C may be equal to twice of the length of the spot tilt e. The length of the GC may be equal to the length a of the light spot. Correspondingly, according to the three-dimensional model of the light spot and the photosensitive drum in FIG. 7, the value of the spot tilt e can be determined as:

$$e = \frac{b}{2}\tan\phi\tan\beta,$$

where b is the size of the light spot in the auxiliary scanning direction, the auxiliary scanning direction is a direction perpendicular to the scanning plane of the light beam emitted from the imaging optical system 5, and β is the angle between the light beam emitted from the imaging optical system 5 in the auxiliary scanning direction and the normal line of the scanned surface 6.

When the light beam scans back and forth on the scanned surface 6, the size b in the auxiliary scanning direction and the angle β between the light beam in the auxiliary scanning direction and the normal line of the scanned surface 6 may be fixed, and the scanning position may constantly change, resulting in a continuous change of Φ. The spot tilt e may also change with Φ. When the light spot is farther away from the main optical axis of the imaging optical system 5, the value of the spot tilt e may be larger, causing the exposure size of the light spot in the main scanning direction to increase. Correspondingly, exposure points at two ends of edges of the photosensitive drum may tilt and the actual exposure point size may increase, which in turn has an impact on the quality of the printed image. To ensure the quality of the printed image and avoid latent image curvature, when the optical deflector 4 in one embodiment deflects the light beam emitted by the light source 1 at the maximum deflection angle, a maximum incident angle $\Phi_{max}$ between the light beam emitted from the imaging optical system 5 in the main scanning direction and the normal line of the scanned surface 6, and a spot tilt rate e/a of the light spot with which the imaging optical system 5 forms images on the scanned surface 6 satisfies:

$$\frac{e}{a} \leq 10\%, \qquad (Eq.\ 1)$$

where a is a size of the light spot in the main scanning direction, e is the spot tilt with $$e = \frac{b}{2}\tan(\phi_{max})\tan\beta,$$

b is a size of the light spot in the auxiliary scanning direction, the auxiliary scanning direction is a direction perpendicular to the scanning plane of the light beam emitted from the imaging optical system 5, and β is the angle between the light beam emitted from the imaging optical system 5 in the auxiliary scanning direction and the normal line of the scanned surface 6.

In one embodiment, the imaging optical system 5 may make the light beam deflected by the deflector 4 scan and move on the scanned surface 6 in the main scanning direction X at a constant linear velocity, and focus the light beam in the main scanning direction X and the auxiliary scanning direction Y on the scanning surface 6 to form the light spot.

In the embodiments shown in FIG. 1 and FIG. 2, the imaging optical system 5 in the optical scanning device may be an F-θ lens. In one embodiment, the optical scanning device may have a set of parameters shown in Table 1.

As shown in Table 1, half of the maximum effective scanning angle of the optical scanning device may be 52.08°, where the maximum effective scanning angle can be understood as the maximum effective scanning angle of the incident light of the imaging optical system 5. The effective scanning width of the optical scanning device may be 216 mm, which can be understood as the scanning width of the light emitted by the imaging optical system 5 in the main scanning direction on the scanned surface 6 or can be understood as the effective width on the scanned surface 6 in the main scanning direction (for example, the effective horizontal scanning width of the photosensitive drum in the printer). When the maximum scanning incident angle of the optical scanning device is $\Phi_{max}$ (36.84°), a distance between the spot position on the photoreceptor and the center of the optical axis may be the focal length. The maximum scanning height of the optical scanning device may be 108 mm when $\Phi_{max}$ is 36.84°. The maximum incident angle of the optical scanning device incident on the scanned surface 6 in the main scanning direction may be 36.84°, which can be understood as the angle formed by the outermost deflected light beam in the main scanning direction and the normal line of the scanned surface 6. The light source 1 may be a point light source using a laser diode (LD), and the laser wavelength of the light source 1 may be 788 nm. The imaging optical system 5 may be an F-θ lens, and the refractive index of the F-θ lens may be 1.535. The distance from the deflection surface of the optical deflector 4 to the incident surface of the main optical axis of the F-θ lens may be 21.9 mm, as shown by L1 in FIG. 1. The thickness of the main optical axis lens of the F-θ lens may be 9 mm, as shown by L2 in FIG. 1. The distance from the main optical axis exit surface of the F-θ lens to the scanned surface 6 along the main optical axis direction may be 95.8 mm, as shown by L3 in FIG. 1.

In the present disclosure, different ways may be adopted to make the optical scanning device satisfy Eq. 1. For example, in one embodiment, $\Phi_{max}$ may be configured to satisfy:

$$35° \leq \Phi_{max} < 45° \qquad (Eq.\ 2).$$

For example, $\Phi_{max}$ may be configured to be 35°, such that a relatively small spot tilt and tilt rate may be achieved. Three implementation examples will be used to analyze the spot tilt and tilt rate for the light spot with different size and different $\Phi_{max}$. In the first example, β is 5°. In the second example, β is 7°. In the third example, β is 10°.

TABLE 1

| Parameter | Value |
| --- | --- |
| Half of maximum effective scanning angle $\theta_{max}$ (°) | 52.08 |
| Effective scanning width W (mm) | 216 |
| Fθ coefficient K (mm/rad) | 118.826 |
| Maximum scanning height Ymax (mm) | ±108 |
| Maximum incident angle Φmax (°) | 36.84 |
| Laser wavelength λ (nm) | 788 |
| Lens refractive index n | 1.535 |
| Distance L1 between the optical deflector 4 and the incident surface of lens (mm) | 21.9 |
| Lens thickness L2 (mm) | 9.0 |
| Distance L3 between lens exiting surface and photosensitive device surface (mm) | 95.8 |

In the first example where β is 5°, the values of the spot tilt e and the spot tilt rate e/a corresponding to different light spot size and $\Phi_{max}$ are shown in Table 2.

In the second example where β is 7°, the values of the spot tilt e and the spot tilt rate e/a corresponding to different light spot size and $\Phi_{max}$ are shown in Table 3.

In the third example where β is 10°, the values of the spot tilt e and the spot tilt rate e/a corresponding to different light spot size and $\Phi_{max}$ are shown in Table 4.

TABLE 2

| | | | β = 5° | | | | | | |
| --- | --- | --- | --- | --- | --- | --- | --- | --- | --- |
| | | $\Phi_{max}$ | Spot 1 | Spot 2 | Spot 3 | Spot 4 | Spot 5 | Spot 6 | Spot 7 |
| Light spot size (μm) | Main scanning a | — | 60 | 60 | 70 | 70 | 70 | 80 | 80 |
| | Auxiliary scanning b | — | 70 | 80 | 70 | 80 | 90 | 80 | 90 |
| Spot tilt e (μm) | | 35° | 2.1 | 2.5 | 2.1 | 2.5 | 2.8 | 2.5 | 2.8 |
| | | 40° | 2.6 | 2.9 | 2.6 | 2.9 | 3.3 | 2.9 | 3.3 |
| | | 45° | 3.1 | 3.5 | 3.1 | 3.5 | 3.9 | 3.5 | 3.9 |

TABLE 2-continued

β = 5°

| | | $\Phi_{max}$ | Spot 1 | Spot 2 | Spot 3 | Spot 4 | Spot 5 | Spot 6 | Spot 7 |
|---|---|---|---|---|---|---|---|---|---|
| Spot tilt rate e/a | | 35° | 3.6% | 4.1% | 3.1% | 3.5% | 3.9% | 3.1% | 3.4% |
| | | 40° | 4.3% | 4.9% | 3.7% | 4.2% | 4.7% | 3.7% | 4.1% |
| | | 45° | 5.1% | 5.8% | 4.4% | 5.0% | 5.6% | 4.4% | 4.9% |

TABLE 3

β = 7°

| | | $\Phi_{max}$ | Spot 1 | Spot 2 | Spot 3 | Spot 4 | Spot 5 | Spot 6 | Spot 7 |
|---|---|---|---|---|---|---|---|---|---|
| Light spot size (μm) | Main scanning a | — | 60 | 60 | 70 | 70 | 70 | 80 | 80 |
| | Auxiliary scanning b | — | 70 | 80 | 70 | 80 | 90 | 80 | 90 |
| Spot tilt e (μm) | | 35° | 3.0 | 3.4 | 3.0 | 3.4 | 3.9 | 3.4 | 3.9 |
| | | 40° | 3.6 | 4.1 | 3.6 | 4.1 | 4.6 | 4.1 | 4.6 |
| | | 45° | 4.3 | 4.9 | 4.3 | 4.9 | 5.5 | 4.9 | 5.5 |
| Spot tilt rate e/a | | 35° | 5.0% | 5.7% | 4.3% | 4.9% | 5.5% | 4.3% | 4.8% |
| | | 40° | 6.0% | 6.9% | 5.2% | 5.9% | 6.6% | 5.2% | 5.8% |
| | | 45° | 7.2% | 8.2% | 6.1% | 7.0% | 7.9% | 6.1% | 6.9% |

TABLE 4

β = 10°

| | | $\Phi_{max}$ | Spot 1 | Spot 2 | Spot 3 | Spot 4 | Spot 5 | Spot 6 | Spot 7 |
|---|---|---|---|---|---|---|---|---|---|
| Light spot size (μm) | Main scanning a | — | 60 | 60 | 70 | 70 | 70 | 80 | 80 |
| | Auxiliary scanning b | — | 70 | 80 | 70 | 80 | 90 | 80 | 90 |
| Spot tilt e (μm) | | 35° | 4.3 | 4.9 | 4.3 | 4.9 | 5.6 | 4.9 | 5.6 |
| | | 40° | 5.2 | 5.9 | 5.2 | 5.9 | 6.7 | 5.9 | 6.7 |
| | | 45° | 6.2 | 7.1 | 6.2 | 7.1 | 7.9 | 7.1 | 7.9 |
| Spot tilt rate e/a | | 35° | 7.2% | 8.2% | 6.2% | 7.1% | 7.9% | 6.2% | 6.9% |
| | | 40° | 8.6% | 9.9% | 7.4% | 8.5% | 9.5% | 7.4% | 8.3% |
| | | 45° | 10.3% | 11.8% | 8.8% | 10.1% | 11.3% | 8.8% | 9.9% |

The seven light spot sizes in Table 2 to Table 4 are the most common spot sizes. Generally, the light spot size in a laser scanning device that realizes a resolution of 600 dpi may be about 60 to 80 μm in the main scanning direction and about 70 to 90 μm in the auxiliary scanning direction.

Figure 8:
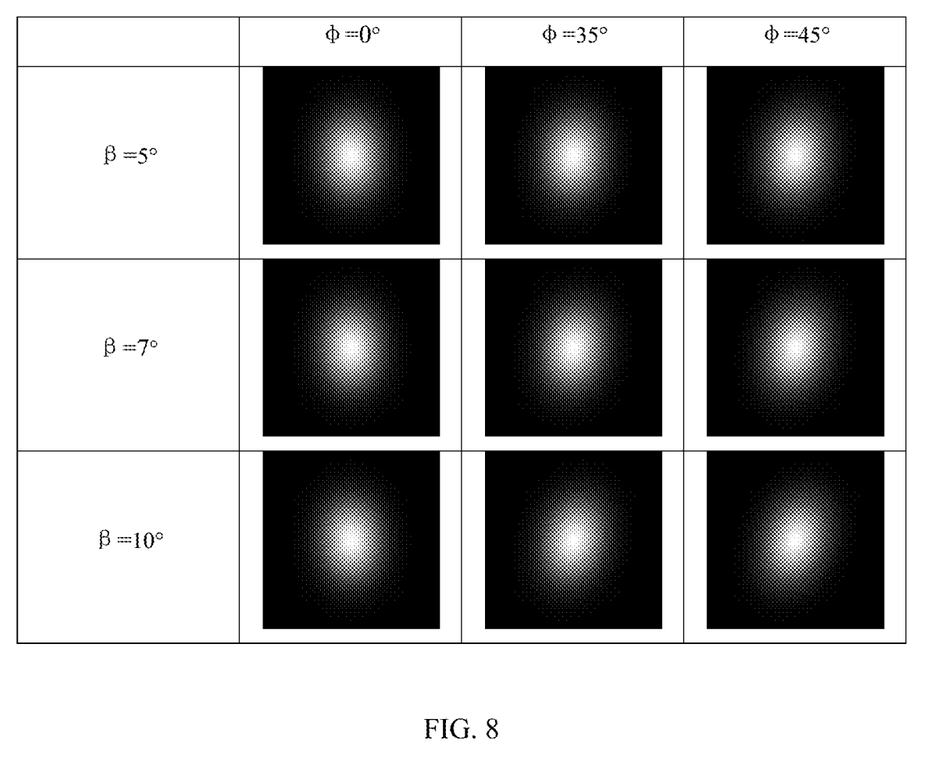
FIG. 8 illustrates a distribution of light energy when a light beam is incident on a surface of a photosensitive drum consistent with various disclosed embodiments in the present disclosure.

FIG. 8 illustrates a distribution of light energy when a light beam is incident on a surface of a photosensitive drum consistent with various disclosed embodiments in the present disclosure. In the embodiment shown in FIG. 8, the light beam with the light spot size a of 60 μm in the main scanning direction and the light spot size b of 80 μm in the auxiliary scanning direction may be used, corresponding to the spot 2 in Table 2 to Table 4. FIG. 8 is an intuitive comparison of the spot tilt. In FIG. 8, Φ=0° represents the light energy distribution diagram of the spot at the intersection of the light beam incident on the surface of the photosensitive drum and the main optical axis of the imaging optical system 5. In the three light energy distribution diagrams corresponding to Φ=0°, the light spots are not tilted, and the image quality of the corresponding printing is the best. In the light energy distribution diagram corresponding to Φ=35°, it can be seen that the light spot is slightly tilted, but not obvious. In the light energy distribution diagram corresponding to Φ=45°, the amount of the spot tilt is further increased. Especially when β=10° and Φ=45°, the corresponding light spot already has an obvious tilt that can be recognized by the human eye, which is likely to affect the quality of the printed image.

In the following, in conjunction with Table 2 to Table 4, the spot tilt e and the spot tilt rate e/a are used to compare the tilt state of the light spot.

In Table 2 corresponding to the first example and Table 3 corresponding to the second example, there is no spot tilt rate larger than 10%. The first example corresponds to the light energy distribution map in the first row in FIG. 8, and the second example corresponds to the light energy distribution map in the second row in FIG. 8.

The light energy distribution in the first row of FIG. 8 with Φ=35° corresponds to the spot tilt rate of 4.1% in Table 2; the light energy distribution with Φ=45° corresponds to the spot tilt rate of 5.8% in Table 2. Each spot tilt rate corresponding to each light spot in Table 2 increases with the increase of Φ, but all are less than 10%.

The light energy distribution in the second row of FIG. 8 with Φ=35° corresponds to the spot tilt rate of 5.7% in Table 3, and no obvious tilt is observed. The light energy distribution with Φ=45° corresponds to the spot tilt rate of 8.2% in Table 3, and a slight tilt is observed. The spot tilt rate corresponding to each light spot in Table 3 increases with the increase of Φ, but all are less than 10%, which does not affect the imaging quality and the quality of the printed image.

The light energy distribution in the third row with Φ=35° in FIG. 8 corresponds to the spot tilt rate of 8.2% in Table 4, and the spot tilt rate is consistent with the light spot corresponding to Φ=45° in Table 3, with a slight tilt. The light energy distribution in the third row of FIG. 8 with Φ=45° corresponds to the spot tilt rate of 11.8% in Table 4, which has obvious tilt. The spot tilt rate corresponding to each spot in Table 4 also increases with the increase of Φ, but there are four spot tilt rates larger than 10%. The four spot tilt rates larger than 10% are respectively 10.3%, 11.8%, 10.1%, and 11.3% corresponding to Φ=45°, which all will affect the image quality and print image quality.

A longitudinal comparison of the data shown in Table 2 to Table 4 shows that after β increases, the value of the spot tilt e and the spot tilt rate e/a of a same light spot will increase. Correspondingly, as shown in the change of the light energy distribution in the third column of FIG. 8 with Φ=45°, the light spot becomes more tilted as β increases. As shown in the three light energy distribution corresponding to β=7° of FIG. 8, the light spot corresponding to Φ=0° is still not tilted, while the light spot corresponding to Φ=35° is already slightly tilted compared to β=5°. The corresponding spot tilt rate is 8.2%, which is still less than 10%. When Φ=45°, there is an obvious tilt, and the spot tilt rate is 11.8%. It can be seen that the smaller β is, the smaller the effect on the light spot tilt is. As shown in Table 2 and Table 3, compared with the first example, in the second example, when β is reduced from 7° to 5°, the spot tilt e and the spot tilt rate e/a of a same spot also decreases. Among the seven commonly used light spot sizes (shown by spot 1-7 in Table 2 to Table 4), the maximum spot tilt rate e/a in Table 1 and Table 2 is 8.2%, which does not exceed 10% and will not have a significant influence on the print quality. Compared with the first example and the second example, in the third example, after β is increased, the spot tilt e and the spot tilt rate e/a of a same spot will continue to increase. Especially when Φ=40°, the maximum value of the spot tilt rate e/a reaches 9.9%, and does not exceed 10%. It will not have a significant influence on the image and can be used. But when Φ continues to increase to $\Phi_{max}$ of 45°, in the current commonly used spot size, the maximum value of e/a reaches 11.8%, which exceeds the critical value of 10%. The case with 11.8% corresponds to the light energy distribution with Φ=45° β=10° in FIG. 8. The light spot is significantly tilted, and significant image defects are produced on the actual image.

The size of the seven light spots in the above three tables satisfies 1.0≤(b/a)≤1.33. With the increase of Φ (from 35° to 45°), the spot tilt e of a same spot will increase and the spot tilt rate e/a will also increase. Only when β=10° and Φ=45° in the third example, e/a exceeds 10%. Other combinations may not have a significant influence on the images. It can be seen that in the commonly used spot size, as long as the maximum value of Φ is controlled below 40°, the spot tilt rate e/a can be guaranteed to be less than 10%, and the scanning angle will not be too large to affect the quality of the printed edge image.

In the present disclosure, the optical scanning device may include the light source 1, the optical deflector 4 configured to deflect the light beam emitted by the light source 1 to make the light beam scan in the main scanning direction, and the imaging optical system 5 configured to guide the light beam deflected by the optical deflector 4 to the scanned surface 6 for imaging. When the optical deflector 4 deflects the light beam emitted by the light source 1 at the maximum deflection angle, the light beam emitted by the imaging optical system 5 may form a maximum incident angle with the normal line of the scanned surface 6 in the main scanning direction, and the spot tilt rate of the light spot formed by the imaging optical system on the scanned surface 6 may satisfy $$\frac{e}{a} \leq 10\%.$$

The possibility of forming blurred edges of printed images may be reduced and the quality of optical scanning imaging may be improved.

For description purposes only, the previous embodiments with different light spot size are used as examples to illustrate the present disclosure, and do not limit the scope of the present disclosure. In various embodiments, any suitable light spot size may be used. For example, in one embodiment, the scanned surface 6 may be made by organic photoconductor (OPC). In a case of β=5°, when b/a is 1.14 and Φ=36.8° in the main scanning direction, by calculating the spot tilt e of the auxiliary scanning direction of the OPC surface is 2.67 μm. If β=5.1° in the auxiliary scanning direction, the obtained spot tilt rate e/a is 3.8%, which does not exceed 10%, and the image quality will not be affected either.

In some existing optical scanning devices, such as the scanning equipment in some existing printers, if β is too small and the surface of the photosensitive drum is made of a metal, the light beam incident on the surface of the photosensitive drum in the auxiliary scanning direction is at normal incidence or close to a case of normal incidence, it can be understood that the angle formed by the incident light beam and the normal of the photosensitive drum in the auxiliary scanning direction is zero or close to zero. At this time, part of the light beam is likely to be reflected by the photosensitive drum back to the imaging optical system 5 and optical deflector 4. Then, it is deflected by the optical deflector 4 to other positions on the scanned surface 6 again, causing a "phantom" problem. In one embodiment of the present disclosure, to avoid the "phantom" problem, β may be configured to satisfy:

5°≤β≤10°   (Eq. 3).

In various experiments, it is found that, the value of β satisfying Eq. 3 can have the best performance. In one embodiment, combined with the corresponding embodiments in Table 2 to Table 4 above, the value may of β be preferably 5° or 7°, which reduces the spot tilt rate e/a and improves the accuracy of imaging and the printing image.

The light source 1, the optical deflector 4, and the imaging optical system 5 in the above examples use same structures. Only variable control of light spot size, Φ, and β are performed. Optionally, the light source 1 may be at least one point light source that can be modulated, to modulate the size of the light beam emitted by the light source.

In one embodiment shown in FIG. 1, the diaphragm 2 may be disposed at a side of the light source 1 to shape the light beam emitted by the light source 1. The diaphragm 2 can be understood as an aperture with a circular through hole or a square through hole for shaping the light beam emitted from the light source 1 to form a circular or square light spot on the scanned surface 6. The opening of the diaphragm 2 may shape the light beam emitted by the light source 1 and the opening may be, for example, a circle, an ellipse, or a square. Although the diaphragm 2 is provided between the light source 1 and the first optical unit 3 in FIG. 1 and FIG. 2, the position of the diaphragm 2 is not limited by this. For example, in some other embodiments, the diaphragm 2 may be provided between the first optical system 5 and the optical deflector 4. In some other embodiments, the diaphragm 2 can also be omitted.

Optionally, the first optical unit 3 may be an anamorphic lens or a cylindrical collimating lens. The anamorphic lens can be understood as a lens that performs both the functions of a collimator lens and a cylindrical lens.

Optionally, the optical deflector 4 may include a polyhedron body, and surfaces of the polyhedron body may form a plurality of mirror surfaces. The polyhedron body may rotate along a rotating shaft, and the central axis of the rotating shaft may be parallel to the auxiliary scanning direction. Preferably, the rotating polyhedron may have four reflecting mirror surfaces.

Figure 9:
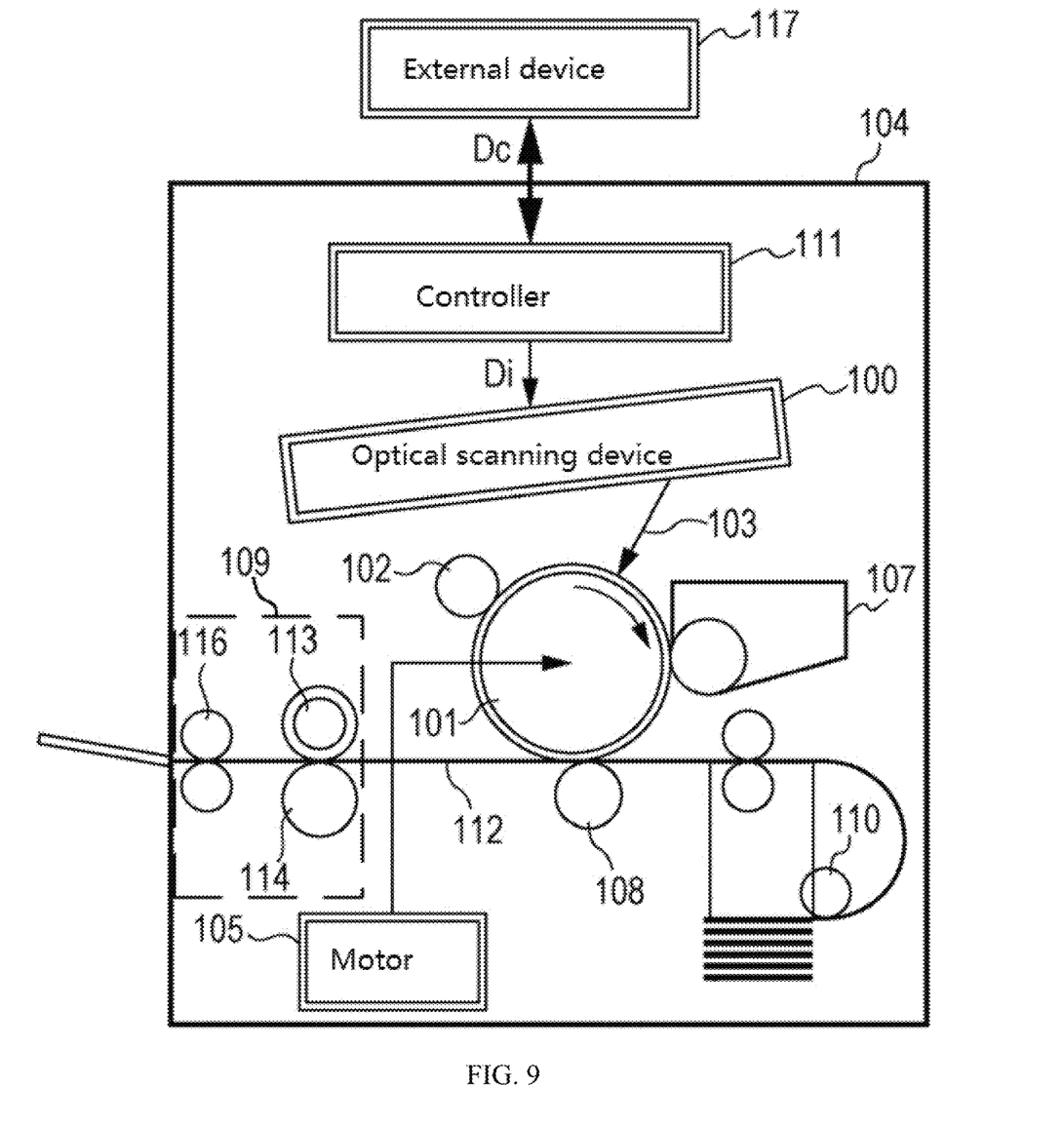
FIG. 9 illustrates an imaging apparatus consistent with various disclosed embodiments in the present disclosure.

The present disclosure also provides an electronic imaging apparatus. As shown in FIG. 9, in one embodiment, the electronic imaging apparatus 104 may mainly include: an optical scanning device 100 provided by various embodiments of the present disclosure, a photosensitive device 101, a developing device 107, a transfer device 108, and a fixing device 113.

The photosensitive device 101 may include a scanned surface 6 and may be used to sense the light beam emitted by the optical scanning device to form an electrostatic latent image on the scanned surface 6.

The developing device 107 may be used for developing the electrostatic latent image to form a toner image.

The transfer device 108 may be used to transfer the toner image to a transfer medium.

The fixing device 109 may be used to fix the transferred toner image on the transfer medium.

As shown in FIG. 9, the electronic imaging apparatus 104 may receive input of code data Dc from an external device 117 including a personal computer. A controller 111 in the apparatus may convert the code data Dc into an image signal (dot data) Di. The image signal Di may be input to the optical scanning device 100 according to various embodiments of the present disclosure. The light beam 103 modulated according to the image signal Di may be emitted from the optical scanning device 100, and the light beam 103 may scan the photosensitive surface (for example, the scanned surface 6) of the photosensitive drum 101 in the main scanning direction. The controller 111 may not only perform the above-mentioned data conversion, but also control various components in the electronic imaging apparatus including a motor 105 described later. The photosensitive drum 101 may be used as an electrostatic latent image bearing member and may be driven by the motor 105 to rotate in a clockwise direction. During the rotation, the photosensitive surface of the photosensitive drum 101 may move relative to the light beam 103 in the auxiliary scanning direction. The photosensitive drum 101 may use a charging roller 102 arranged above the photosensitive drum 101 and in contact with the photosensitive surface, to make the photosensitive surface be uniformly charged. In one embodiment, the charging roller 102 may respond to irradiation of the light beam 103 of the optical scanning device 100, to charge the photosensitive surface. That is, when the scanning light beam emitted by the optical scanning device 100 is detected, the charging roller 102 may charge the photosensitive surface. In one embodiment, the developing device 107 (for example, a developer) may be further included. After irradiating the photosensitive surface with the light beam 103 to form an electrostatic latent image on the photosensitive surface, the developing device 107 arranged at downstream of the rotation direction of the photosensitive drum 101 in contact with the photosensitive surface may develop the electrostatic latent image into a toner image, beginning with the irradiating position of the light beam 103. The transfer device 108 (e.g., a transfer roller) arranged at downstream of the photoreceptor drum 101 and opposite to the photosensitive drum 101 may transfer the toner image developed by the developing device 107 to the transfer medium 112 (e.g., a sheet, a paper, or a photographic paper, etc.). The transfer medium 112 may be stored in a medium storage box at upstream of the photosensitive drum 101 (on the right in FIG. 7), and the feeding of the transfer medium may be continued to be maintained. A feed roller 110 may be provided at the edge of the medium storage box, such that the transfer medium 112 in the medium storage box can be fed to the conveying path. The transfer medium 112 to which the unfixed toner image is transferred as described above may be further conveyed to the fixing device 109 at downstream of the photosensitive drum 101 (the left side in FIG. 7). The fixing device 109 may include a fixing roller 113 in which a fixing heater (not shown) is provided, and a pressure roller 114 provided to press the fixing roller 113. The fixing device 109 may press the transfer medium 112 conveyed from the transfer roller 108 at the pressing portion of the fixing roller 113 and the pressure roller 114 while heating, thereby fixing the unfixed toner image on the transfer medium 112. Further, a discharge roller pair 116 may be provided at downstream of the fixing roller 113, such that the transfer medium 112 on which the toner image is fixed can be transported from the electronic imaging device 104 to the outside. This may complete the printing operation.

In the description of the present disclosure, it should be understood that the terms "center", "length", "width", "thickness", "top", "bottom", "upper", "lower" and ""Left", "right", "front", "rear", "vertical", "horizontal", "inner", "outer", "axial", "circumferential" and other indications or positional relationships are based on the attached drawings. The orientation or positional relationship shown in the drawings is only for the convenience of describing the present disclosure and simplifying the description, rather than indicating or implying that the position or the original must have a specific orientation, with a specific structure and operation, and therefore cannot be understood as a limit on the present disclosure.

In the present disclosure, unless otherwise clearly specified and limited, the terms "installed", "connected", "connected", "fixed", etc. should be interpreted broadly. For example, it may be a fixed connection or a detachable connection, or become a whole. It can be mechanically connected, electrical connection, or communication connection with each other. It can be directly connected or indirectly connected through an intermediate medium, which can make the internal communication of two components or the interaction relationship between two components. For those of ordinary skill in the art, the specific meaning of the above-mentioned terms in the present disclosure can be understood according to specific circumstances.

In the present disclosure, unless otherwise clearly defined and defined, that the first feature is above or below the second feature may include direct contact between the first and second features, or may include the first and second features not in direct contact but through other features between them. Moreover, the first feature "above", "at upper side of", or "on" the second feature of the first feature include the first feature being directly above and obliquely above the second feature, or merely indicating that the first feature is higher in level than the second feature. Similarly, the first feature "below", "under", or "beneath" the second feature may include the first feature directly below and obliquely below the second feature, or simply means that the level of the first feature is smaller than the second feature.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. An optical scanning device, comprising:
a light source, configured to emit a light beam;
a first optical unit, configured to collimate the light beam emitted by the light source in a main scanning direction and focus the light beam emitted by the light source in an auxiliary scanning direction;
an optical deflector, configured to deflect the light beam emitted by the light source; and
an imaging optical system, configured to guide the light beam deflected by the optical deflector to a scanned surface for imaging,
wherein:
when the optical deflector deflects the light beam emitted by the light source at a maximum deflection angle, the light beam emitted from the imaging optical system forms a maximum incident angle $\Phi_{max}$ with a normal line of the scanned surface in the main scanning direction; and
a spot tilt rate e/a of a light spot on the scanned surface formed by the imaging optical system satisfies $$\frac{e}{a} \leq 10\%, \quad \text{(Eq. 1)}$$

wherein a is a size of the light spot in the main scanning direction, e is amount of spot tilt and $$e = \frac{b}{2}\tan(\phi_{max})\tan\beta,$$

b is a size of the light spot in the auxiliary scanning direction perpendicular to the main scanning direction, and β is an angle formed by the light beam emitted from the imaging optical system in the auxiliary scanning direction and the normal line of the scanned surface.

2. The device according to claim 1, wherein $\Phi_{max}$ is configured to satisfy:

$$35° \leq \Phi_{max} < 45° \quad \text{(Eq. 2).}$$

3. The device according to claim 1, wherein:

$\Phi_{max}$ is 35°.

4. The device according to claim 1, wherein β is configured to satisfy:

$$5° \leq \beta \leq 10° \quad \text{(Eq. 3).}$$

5. The device according to claim 4, wherein β is 5° or 7°.
6. The device according to claim 1, wherein:

60 μm≤a≤80 μm, 70 μm≤b≤90 μm.

7. The device according to claim 1, further including a diaphragm unit configured to shape the light beam emitted by the light source.
8. The device according to claim 1, wherein:
the first optical unit includes an anamorphic lens, or
the first optical unit includes an independent collimating lens and a cylindrical lens.
9. The device according to claim 1, wherein:
the imaging optical system is an F-θ lens.
10. An imaging apparatus, comprising:
an optical scanning device including:
a light source, configured to emit a light beam;
a first optical unit, configured to collimate the light beam emitted by the light source in a main scanning direction and focus the light beam emitted by the light source in an auxiliary scanning direction;
an optical deflector, configured to deflect the light beam emitted from the light source; and
an imaging optical system, configured to guide the light beam deflected by the optical deflector to a scanned surface for imaging,
wherein:
when the optical deflector deflects the light beam emitted from the light source at a maximum deflection angle, the light beam emitted from the imaging optical system forms a maximum incident angle $\Phi_{max}$ with a normal line of the scanned surface in the main scanning direction; and
a spot tilt rate e/a of a light spot on the scanned surface formed by the imaging optical system satisfies $$\frac{e}{a} \leq 10\%,$$

wherein a is a size of the light spot in the main scanning direction, e is amount of spot tilt with $$e = \frac{b}{2}\tan(\phi_{max})\tan\beta,$$

b is a size of the light spot in the auxiliary scanning direction perpendicular to the main scanning direction, and β is an angle formed by the light beam emitted from the imaging optical system in the auxiliary scanning direction and the normal line of the scanned surface;
a photosensitive device, provided with the scanned surface and configured to sense the light beam emitted from the optical scanning device to form an electrostatic latent image on the scanned surface;
a developing device configured to make the electrostatic latent image develop to form a toner image;
a transfer device configured to transfer the toner image to a transfer medium; and
a fixing device configured to fix the transferred toner image on the transfer medium.

* * * * *